United States Patent [19]

Warde et al.

[11] Patent Number: 4,794,296

[45] Date of Patent: Dec. 27, 1988

[54] CHARGE TRANSFER SIGNAL PROCESSOR

[75] Inventors: Cardinal Warde, Newton Centre; Robert F. Dillon, Stoneham, both of Mass.

[73] Assignee: Optron System, Inc., Waltham, Mass.

[21] Appl. No.: 840,684

[22] Filed: Mar. 18, 1986

[51] Int. Cl.[4] .......................... G02F 1/03; G02F 1/05; G02B 5/30; H04N 9/31

[52] U.S. Cl. ................................ 313/105 R; 313/524; 313/528; 313/103 CM; 313/535; 350/356; 350/374; 350/393; 332/7.51; 250/315.3; 250/332; 250/334; 174/50.5; 174/50.6; 445/44

[58] Field of Search ...................... 315/1, 3, 3.5, 13.11, 315/169.1; 324/77 R, 77 C, 77 CS; 357/24, 30; 328/277; 313/528, 398, 392, 391, 103 CM, 105 CM, 533, 524, 535, 95; 350/355, 356, 347, 374, 393; 332/7.51; 250/315.3, 332, 333, 334, 366; 382/65; 174/50.5, 50.6; 445/44

[56] References Cited

U.S. PATENT DOCUMENTS

| | | | |
|---|---|---|---|
| 3,760,531 | 9/1973 | Lasser et al. | 313/528 |
| 3,949,264 | 4/1976 | Hofstein | 313/391 |
| 3,982,191 | 9/1976 | Takita et al. | 313/392 |
| 4,253,168 | 2/1981 | Petrosky et al. | 357/24 |
| 4,360,732 | 11/1982 | Chapman et al. | 357/30 |
| 4,481,531 | 11/1984 | Warde et al. | 315/169.1 |

FOREIGN PATENT DOCUMENTS

| | | | |
|---|---|---|---|
| 8501362 | 3/1985 | PCT Int'l Appl. | |
| 1509823 | 2/1976 | United Kingdom | 313/105 |
| 2029633A | 7/1979 | United Kingdom | 313/105 |

OTHER PUBLICATIONS

Thackara et al, "Operating Modes of the Microchannel Spatial Light Modulator", *Optical Engineering*, Nov. 1983, vol. 22, No. 6, pp. 695–703.

Tannas, Jr., "Flat Panel Displays and CRTs", *Van Nostrand Reinhold Company Inc.*, 1985, pp. 213–216.

Weiss et al, "Optical Information Processing Characteristics of the Microchannel Spatial Light Modulator", *Applied Optics*, V20, N12, Jun. 81, pp. 2066–2074.

Warde et al., "Oblique-cut $LiNbO_3$ Microchannel Spatial Light Modulator", *Optical Letters*, V7, N7, Jul. 82, pp. 344–346.

(List continued on next page.)

*Primary Examiner*—David K. Moore
*Assistant Examiner*—Mark R. Powell
*Attorney, Agent, or Firm*—Weingarten, Schurgin, Gagnebin & Hayes

[57] ABSTRACT

The disclosed charge transfer signal processor includes a vacuum housing having an input face and a output face, a 2-D electromagnetic input means cooperative with said input face for providing a 2-D input electronic charge signal within the vacuum housing, transfer means for imaging the 2-D input electronic charge signal in a region of the vacuum housing proximate the vacuum housing output face, and charge feedthrough means coupled to the vacuum housing output face for transferring the imaged 2-D electronic charge signal externally to the vacuum housing. In one embodiment, the charge transfer signal processor is operable as a Gen-I charge transfer amplifier. In another embodiment, a microchannel plate assembly is disposed in the vacuum housing intermediate the input and output faces, and the charge transfer signal processor is operable as a high-gain charge transfer signal amplifier. In a further embodiment, a power microchannel plate assembly is disclosed that is disposed in the vacuum housing intermediate the input and output faces, and the charge transfer signal processor is operable as a high-current charge transfer signal amplifier. The disclosed power microchannel plate assembly preferably includes a 2-D array of axially-aligned discrete dynodes, and a voltage divider network operatively coupled to the 2-D array for providing an electron accelerating potential gradient and for replacing charge as it is depleted by secondary electron emission processes in the several discrete dynodes. The 2-D input electromagnetic signal may either be optical, electronic, or a combination of these two. Various output devices externally mounted to the output face of the vacuum housing are disclosed. Utility includes spatial phase and/or amplitude light modulation, 2-D optical signal processing, and, among others, electromagnetic signal detection.

62 Claims, 17 Drawing Sheets

OTHER PUBLICATIONS

Warde, "Materials and Devices for Optical Information Processing", 170th Meeting Electrochemical Society, V86, N2, Oct. 86, p. 1000.

Dowben et al, "A Metal-Filled Microelectrode", *Science,* V118, 1953, pp. 21-24.

Zhoa Jing-An et al, "A Study of Liquid Crystal Light Value for Large Screen Projection TV", *Display and Imaging Technology,* V1, N2, pp. 151-158, 1986.

"Microchannel Plate Detectors", Joseph Ladislas Wiza, appearing at 162 Nuclear Instruments and Methods, pp. 587-601 (1979).

"Multianode Microchannel Array Detector Systems: Performance Characteristics", J. G. Timothy, appearing at vol. 24, No. 6, Optical Engineering, pp. 1066-1071 (1985).

IBM Technical Disclosure Bulletin, vol. 16, No. 1, pp. 353-354 (1973).

"Feedback Multiplier Flat-Panel Television: I-System Design", John G. Endriz, Scott A. Keneman, and C. A. Catanese at IEEE Trans. on Electron Devices, vol. 26, No. 9, pp. 1324-1358 (1979).

"The Multiplier-Assisted Discharge: A New Type of Cold Cathode", C. A. Catanese and J. G. Endriz, appearing at J. Appl. Phys. 50(2), pp. 731-745 (1979).

"A Flat Alphanumeric Display Tube", W. F. Goede, L. A. Jefferies and J. E. Gunthier, at IEEE Trans. on Electron Devices, vol. 18, No. 9, pp. 642-697 (1971).

"A Novel Cathodoluminescent Flat Panel TV Display", Ronald Schulman and James W. Schwartz, apparently appearing at pp. 134-135, of SID 76 Digest.

"The Channel Electron Multiplier CRT: Concept, Design and Performance", Alfred Woodhead, Derek Washington, Alan Knapp, John Mansell and Colin Overall, appearing at pp. 205-207 of SID 82 Digest.

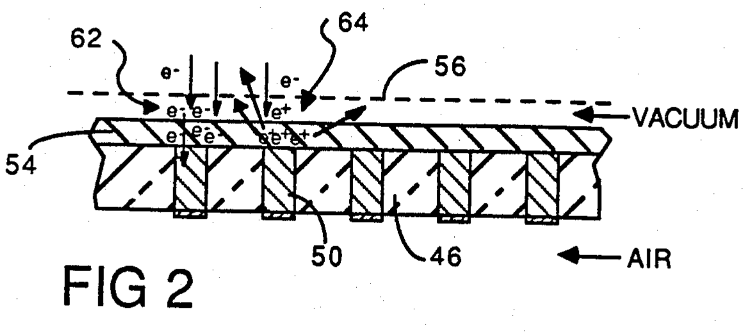
FIG 2
FIG 3A
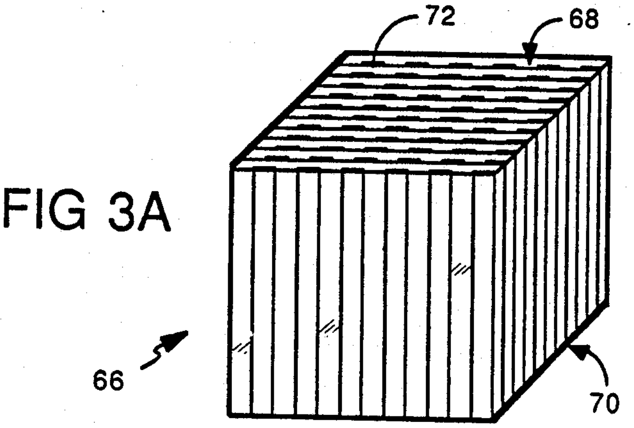
FIG 3B
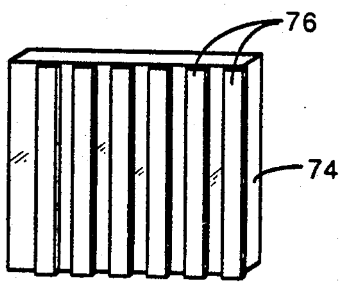

FIG 4A
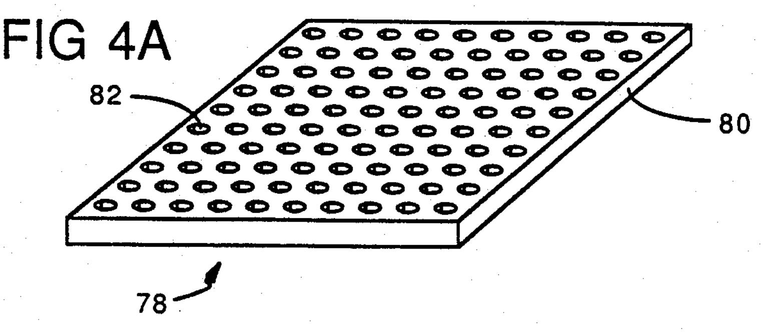
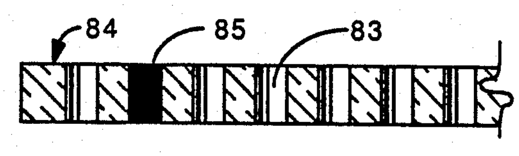
FIG 4B

CHARGE TRANSFER SIGNAL PROCESSOR

This invention was made with Government support under Contract F19628-84-C-0048 awarded by the Department of the Air Force. The government has certain rights in the invention.

FIELD OF THE INVENTION

This invention is directed to the field of signal processing, and more particularly, to a novel charge transfer signal processor.

BACKGROUND OF THE INVENTION

In many applications, it is desirable to convert the spatially-varying signal intensity of an input 2-D electromagnetic signal into an amplified electrical 2-D output signal having a spatially-varying output intensity distribution corresponding to that of the input electromagnetic signal. The output electrical signal in this way preserves the information content of the input electromagnetic signal, but in such a way that it may be advantageously utilized in a host of applications environments that include, but are not limited to, imaging detectors, optical signal processors, real-time adaptive optical systems, and target recognition, tracking and optical communications systems. Such 2-D conversion devices are often called upon to provide a high degree of spatial resolution, wide spectral bandwidths, fast cycle times, the capability to accommodate the heat produced by high-power output utilization devices, control of the electron energy distribution, high-current-level output signals, sensitivity to low input-intensity signal levels, and, among other things, to provide the capability to be fabricated at a reasonably low cost. Reference may be had to U.S. Pat. No. 4,481,531 for an exemplary microchannel spatial light modulator, incorporated herein by reference. The utility of the heretofore known devices has been limited in one or more of the foregoing respects.

SUMMARY OF THE INVENTION

In one embodiment, the charge transfer signal processor of the present invention includes an enclosure defining a vacuum chamber having a first generally planar surface defining an input port and a second generally planar surface spaced from and confronting the first surface defining an output port. A generally planar photocathode member is in communication with the first surface and responsive to incident electromagnetic energy received through the input port for providing an electrical signal having a charge distribution that corresponds to the intensity distribution of the incident electromagnetic energy. A 2-D array of electrically-isolated longitudinally-extending conductors having ends that terminate in first and second planes is coupled to the second surface of the enclosure and mounted within the enclosure with the ends thereof terminating in one of the planes in external communication with the second surface of the enclosure and with the other of the planes thereof internally confronting and in spaced relation to the photocathode member. An enhancer coating of an efficient electron/hole generator is provided over the ends of the 2-D array of electrically-isolated elongated conductors confronting the photocathode. An acceleration grid is provided in the vacuum chamber intermediate the photocathode member and the enhancer coating for providing controlled transport of the photocathode electron distribution to the coated 2-D array of electrically-isolated elongated conductors. The intensity of the transported electrons is amplified by the enhancer coating, and the amplified electrons are locally fed through the conductors providing a spatially varying electron intensity distribution at the output port that corresponds to the intensity distribution at the input port. In this embodiment, the charge transfer signal processor is operable as a high-spatial-resolution, high-temporal-resolution, gen-I type charge transfer amplifier.

In a further embodiment, one or more microchannel plates are operatively connected between the photocathode member and the acceleration grid within the vacuum enclosure of the charge transfer signal processor. The one or more microchannel plates are operative in response to the photocathode electron distribution to locally amplify the electron charge distribution in such a way that it is everywhere representative of the spatial intensity distribution of the input electromagnetic signal. The electric field provided by the grid proximity focuses the amplified charge distribution onto the enhancer coating of the output conductor array, which, in turn, feeds it externally of the enclosure. In this embodiment, the charge transfer signal processor is operable as a high-gain charge transfer amplifier.

In a further embodiment, the charge transfer signal processor further includes a power microchannel plate operatively connected in the vacuum chamber intermediate the input port and the acceleration grid of the vacuum enclosure. The power microchannel plate includes a laminated stack of perforated insulative sheets alternating with secondary-electron emitting and electrically conductive layers. The several layers cooperate with the several perforated insulative sheets to provide a 2-D array of plural axially-aligned discrete dynodes. A potential gradient is applied across the several layers in such a way that the power microchannel plate is operative as an electron amplifier capable of delivering high output current densities. In this embodiment, the charge transfer signal processor is operable as a high-current charge transfer amplifier.

Different light modulating elements or electronic signal output devices are selectively couplable to the output port of the charge transfer signal processor and externally of the enclosure. In dependence on the type of output device selected and on the particular embodiment, the novel charge transfer signal processor of the present invention is operative, among others, to provide high-speed, low-light-level, deformable mirrors for adaptive optics applications; ultra-high-speed, low-light-level, high-resolution spatial phase and amplitude modulators for optical computing, target recognition, tracking and signal processing; and, among others, ultra-fast, low-light-level, high-resolution detectors for astronomy and for optical communications applications.

In each of the several embodiments, the input electromagnetic signal can be optical, electrical, or a combination of the two. The optical input signals may be either coherent or incoherent. The input electrical signal may be a controlled electron-beam write source. For operation in a hybrid input mode, both a light input and an electron-beam input can be simultaneously and/or successively applied.

BRIEF DESCRIPTION OF THE DRAWINGS

These and other features and attendant advantages of the present invention will become apparent as the invention becomes better understood by referring to the following solely exemplary and non-limiting detailed description of the preferred embodiments thereof, and to the drawings, wherein:

FIG. 2 is a schematic diagram useful in illustrating two modes by which information is written in the charge transfer signal processor according to the present invention;

FIG. 3 is a perspective view illustrating in FIGS. 3A and 3B thereof one embodiment of a charge collecting and feed-through plate assembly of the charge transfer signal processor according to the present invention;

FIG. 4 illustrates in FIG. 4A a perspective view and in FIG. 4B a partial sectional view illustrating a second embodiment of the charge collecting and feed-through plate assembly of the charge transfer signal processor according to the present invention;

DETAILED DESCRIPTION OF THE PREFERRED EMBODIMENT

Figure 1A:
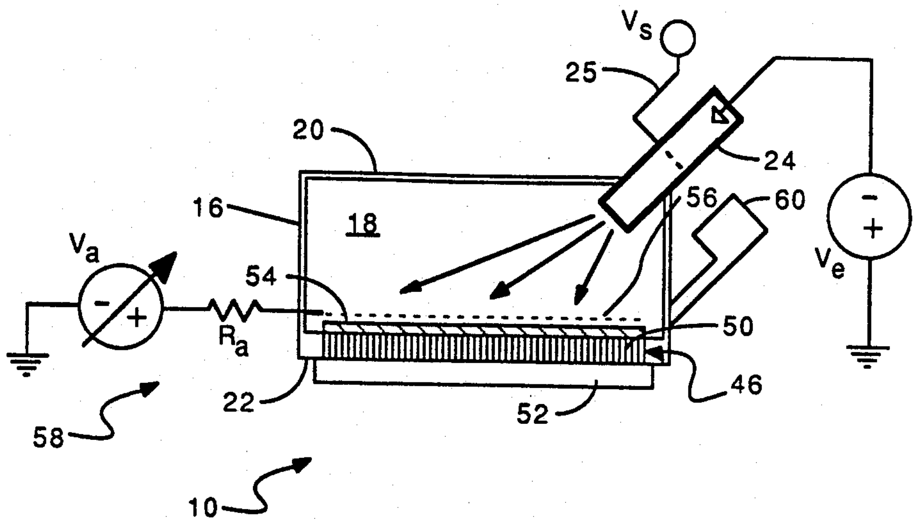
FIG. 1 illustrates in FIGS. 1A–1C thereof diagrammatic views of a first embodiment of the charge transfer signal processor according to the present invention respectively showing three different input electromagnetic structures.
Figure 1B:
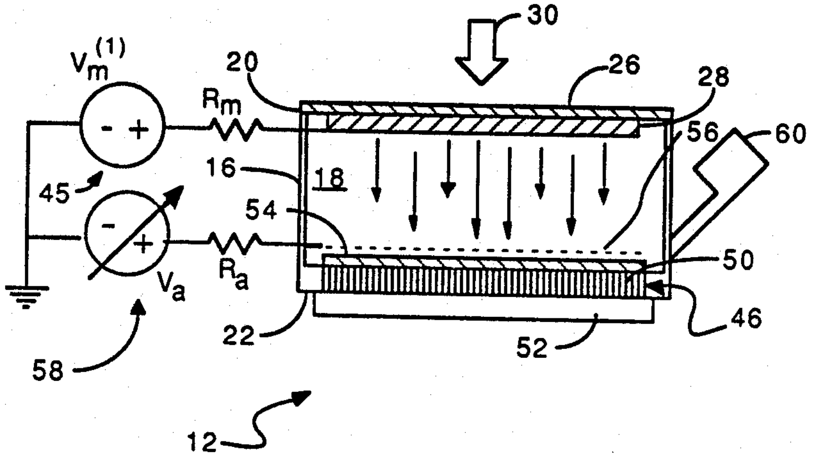
Figure 1C:
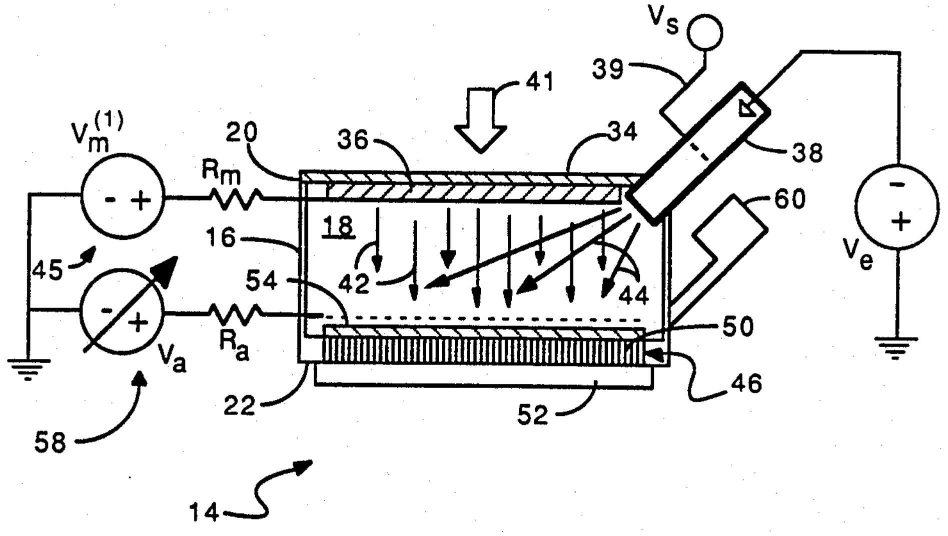

Referring now to FIG. 1, respectively generally designated at 10, 12, and 14 in FIGS. 1A, 1B, and 1C are three embodiments of a gen-I type charge transfer signal processor according to the present invention. The charge transfer devices 10, 12, 14 are substantially identical and principally differ in the structure of the input electromagnetic excitation signal source. The charge transfer devices 10, 12, 14 each include a housing 16 defining an enclosed vacuum generally designated 18. The housings 16 each include top input and bottom output faces 20, 22 of a generally-cylindrical shape that respectively define 2-D input and output ports.

A source of electrons, such as from an electron gun 24 vacuum-mounted through the face 20, is provided for writing an input 2-D electromagnetic signal into the charge transfer signal processor 10 of FIG. 1A. An electron control signal 25 marked "$V_s$" is controllably applied to the gun 24. An optically-transmissive window 26 having a deposited layer of a photoemissive material 28 defining a photocathode is vacuum-mounted to the face 20 of the charge transfer signal processor 12 of FIG. 1B. The photocathode 28 cooperates with incident 2-D write light schematically illustrated by an arrow 30 for providing an input 2-D electrical charge distribution, schematically illustrated by variable-length arrows 32, that everywhere locally corresponds to the 2-D intensity distribution of the input write light 30. An optically transmissive window 34 having a desposited layer 36 of any suitable photoemissive material defining a photocathode, and a source 38 of write electrons, such as from an electron gun 38, are vacuum-mounted to the top input face 20 of the charge transfer signal processor 14 in FIG. 1C. An electron control signal 39 marked "$V_s$" is controllably applied to the gun 38. The photocathode 36 is cooperative with write light schematically illustrated by an arrow 41 to provide a spatially-varying 2-D electron distribution that everywhere locally corresponds to the intensity distribution of the write light 41, as schematically illustrated by variable length arrows 42, and the electron source 38 is operative to provide a 2-D electron pattern illustrated by arrows 44. The write light, which may be either coherent or incoherent, and the write electrons, can be either sequentially or simultaneously applied. A biasing network generally designated 45 and marked "$V_m^{(1)}$" is operatively coupled to the photocathodes 28, 36 in FIGS. 1B, 1C, and a biasing network generally designated 47 and marked "$V_c$" is operatively coupled to the cathodes of the guns 24, 38 in FIGS. 1A, 1C. Conventional magnetic, electrostatic, or electromagnetic techniques are employed in the electron guns 24, 38 for electron beam focus and deflection.

A charge transfer feedthrough plate subassembly generally designated 46, to be described, is vacuum-mounted within the bottom output face 22 of the housings 16 of the charge transfer signal processors 10, 12, and 14. The charge transfer feedthrough plate subassemblies 46 each include plural electrically-isolated elongated conductors 50 therethrough the ends of which respectively terminate in a first planar surface internally of the housings 16 and a second planar surface externally of the housings 16. The conductors 50 of the charge transfer feedthrough plate subassembly have a very high spatial density, and are operative to controllably transfer a 2-D electronic charge pattern to the exterior of the housing 16 with a very high spatial resolution. An output device 52 to be described is externally mountable to the output port of the housing 16 and operatively connected electrically to the elongated conductors 50 of the corresponding charge transfer feedthrough plate subassembly 46. The external mounting of the output device 52 makes possible the selection of a wide variety of devices to be described. For example, the output devices then need not be vacuum compatible. Further, they can be externally cooled for high-power applications, and can be readily removably replaced without requiring substantial system disconnection.

A layer of a charge enhancing material 54 is deposited over the inner plane at which the conductor 50 of the charge transfer feedthrough plate subassembly 46 terminate. The layer 54 may be, for example, either a coating of a high secondary electron emitter substance such as MgO or Cu:BeO or an efficient electron/hole generating substance such as silicon or germanium. In the case of the high secondary electron emitter substances the gain provided by the enhancing layer 54 provides for high-sensitivity to the level of the input signal, a high temporal bandwidth, and for control of the write modes to be described of the charge transfer signal processor.

In the case of the electron/hole generating substances, the gain provided by the enhancing layer 54 provides for high-sensitivity to the level of the input signal and provides for a high temporal bandwidth.

A grid 56, maintained at a positive potential by a variable voltage source generally designated 58 and marked "$V_a$", is positioned in the vacuum chamber 18 intermediate the front face 20 and the enhancer coating 54. The grid 56 provides an electric field within the vacuum chamber 18 predominately having only longitudinal electric field components. This field accelerates the 2-D input charge distribution by Coulombic attraction, and images it on the enchancer coating 54 by proximity focusing. Erasure may be provided by flooding the coating 54 from either of the sources of the input electromagnetic signal. An optional electron gun 60 is vacuum-mounted to the housings 16 in position to conveniently flood the coatings 54 for image erasure purposes. It will be appreciated that although electrostatic proximity focusing is disclosed in the preferred embodiments, other suitable charge imaging techniques, such as magnetic, electric, or a combination of the electric and the magnetic, can as well be employed without departing from the inventive concept.

The voltage selected for the grid 56 controls the acceleration of the electrons through the vacuum chamber 18 and therewith controls the kinetic energy of the charges incident on the enhancer coating 54. Where high secondary electron emitting coatings are used, as will be appreciated by those skilled in the art, the gain, DELTA, of the particular material selected for the enhancer coating 54 is a function of the kinetic energy of the incident electron stream. The gain can then be selected to be either greater than or less than unity by varying the grid voltage accordingly. For comparatively-low voltages and corresponding kinetic energies, the gain is selectable to be less-than-unity. In this case, more electrons arrive that are given off the less-than-unity gain coating, so that the electrons that are incident on the enhancer coating accumulate thereon as generally designated at 62 in FIG. 2. For comparatively-high grid voltages and corresponding kinetic energies, the gain is selectable to be greater-than-unity. In this case, more electrons are emitted off of the coating than are accumulated thereon, due to the selected high gain coefficient, so that electrons are locally depleted about the surface of the enhancer coating in accordance with the incident intensity of the 2-D electronic charge distribution as generally designated at 64 in FIG. 2. If a comparatively-high resistance enhancer coating 54 is selected, the incident electronic charge integrates during image writing thereonto, and if a comparatively low-resistance enhancer coating 54 is selected, the electronic charges bleed off the enhancer coating at a specific rate. The charge transfer signal processor of the present invention is then in this manner selectably operable in either of a framed or a continuous mode.

In the framed mode, images may be written either by electron depletion or by electron accumulation. If the potential of the source 58 is selected such that the incident electronic charges have a kinetic energy that corresponds to operation in the greater-than-unity gain regime, more electrons are given off the enhancer coating by secondary emission than are received so that the image is written in an electron depletion write mode. At the termination of the write period, the accumulated image is erased by flooding the enhancer coating 54 with electrons as from the gun 60. If the potential of the source 58 is selected so that the kinetic energy of the incident electronic charges corresponds to operation in the less-than-unity gain regime, the number of the incident electrons is greater than the electrons knocked thereout by secondary emission such that the image is written by electron accumulation. At the end of the write period, the image is erasable as by controlled emission from the flood gun 60, by flooding the photocathode with light, or by defocusing the signal electron gun 24, 38 as appropriate.

Where efficient electron/hole generators are used for the enhancer coatings, the voltage selected for the grid controls the acceleration of the electrons, and correspondingly their kinetic energy at incidence on the enhancer coating 54. An intended gain, as will be appreciated by those skilled in the art, is provided by selecting the magnitude of the incident kinetic energy of the electron stream, whereby corresponding quantities of electron/hole pairs are generated within the semiconductor material of the enhancer coatings in dependence on the kinetic energy selected. Where necessary, and in accord with the particular output device utilized, the electron erasure gun then floods the enhancer coatings with a uniform electron flux for image erasure purposes.

Referring now to FIG. 3, generally designated at 66 in FIG. 3A is a perspective view of one embodiment of the charge transfer feedthrough plate subassembly of the charge transfer signal processor according to the present invention. The assembly 66 inlcudes an upper, optically-flat generally-planar surface generally designated 68, a lower, optically-flat generally-planar surface generally designated 70, and a 2-D array of electrically-isolated elongated conductors 72 longitudinally extending from the surface 68 to the surface 70. The assembly 66 is preferably fabricated as a fritted, vacuum-tight lamination of plural glass substrates 74 having plural, generally parallel conductive metallic traces 76 on one of the surfaces thereof as best seen in FIG. 3B. Typically, the charge transfer feedthrough plate subassembly 66 is provided with approximately 250,000 to thirty-six million conductors disposed in 25 millimeter to 150 millimeter square area. The substrates 74 may be 50 micrometer thick glass plates, and the conductors 76 may have exemplary dimensions of about a 5 micrometer thickness, 30 micrometer widths, and a 50 micrometer innerspacing. The charge transfer feedthrough plate subassembly 66 is preferably fabricated by evaporating a metal onto the glass plates 74, and the electrodes 76 are formed thereon preferably by well-known photolithographic techniques. The sheets are cut into the intended dimensions, are stacked, and then are fritted in an evacuated oven to form a preform. The preform is then shaped in an optical lathe into a cylindrical body, transversely cut into the intended widths, and the opposed ends of the resulting charge transfer feedthrough plate subassemblies are polished opitcally flat.

Referring now to FIG. 4A, generally designated at 78 is a perspective view illustrating another embodiment of the charge transfer feedthrough plate subassembly of the charge transfer signal processor according to the present invention. The assembly 78 includes an insulative substrate 80, and a plurality of electrically-isolated, vacuum-tight elongated conductors 82 defining a 2-D array longitudinally extending from the top to the bottom of the substrate 80. As can best be seen in FIG. 4B, the substrate 80 preferably includes a glass capillary array 83 having a plurality of apertures generally designated 84 provided therethrough in a regular 2-D pattern. In a presently preferred fabrication sequence, Indium or other suitable conductive material schematically illustrated in solid outline 85 is provided in all of the apertures 84, the stuffed-array is shaped into a cylindrical body in an optical lathe, and then the upper and lower surfaces of the feedthrough plate subassembly 78 are polished optically flat.

In the operation of the charge transfer signal processor of FIG. 1, the photocathode, the electron gun, or a combination of the two, are operative to controllably write a 2-D electronic input signal into the vacuum chamber of the corresponding vacuum housing. The grid images the electron flux 17, 32, 42, 44 onto the enhancer coating, in such a way that the resulting amplified surface charge distribution on the enhancer coating spatially varies as the intensity of the incident electron flux spatially varies. The feedthrough plate assembly transfers this charge distribution exteriorly of the housing and electrically couples it to the associated output device. The output device can be either electrical, optical, or electro-optical, among others, to be described. For exemplary operation in the framed mode, the electron erase gun periodically floods the enhancer coating for image erasure, and the above process is repeated cyclically.

Figure 5A:
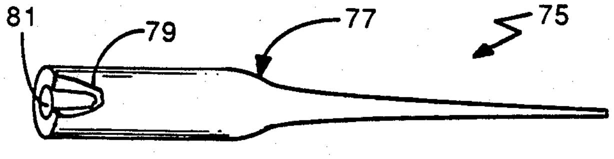
FIG. 5 illustrates in FIG. 5A a perspective view and in FIG. 5B a partial sectional view illustrating a third embodiment of the charge collecting and feed-through plate assembly of the charge transfer signal processor according to the present invention.
Figure 5B:
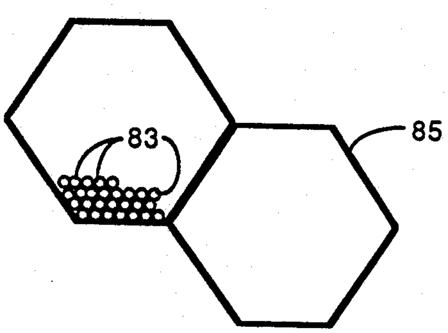

Referring now to FIG. 5A, generally designated at 75 is a pictorial perspective view illustrating a further embodiment of the charge transfer feedthrough plate subassembly of the charge transfer signal processor according to the present invention. A drawable preform generally designated 77 includes an outer insulative sheat 79 such as glass and an inner co-axial conductive core 81 such as either a high-conductivity glass or a low-melting-point metal such as indium, lead or tin. The preform is drawn into a filament by well-known techniques, as is schematically illustrated in FIG. 5A by the elongated tapering tail portion, and after being cut into intermediate lengths, plural filaments 83 are stacked into hexagonal or other close-packing templates 85 as shown in FIG. 5B. The several filaments 83 in the hexagonal templates 85 are fused to provide a 2-D array of electrically-isolated longitudinally extending and vacuum-tight conductors, the assembly then is transversely cut into intended longitudinal widths, and the upper and lower surfaces of the resulting feedthrough plate subassemblies are polished optically flat.

Figure 6A:
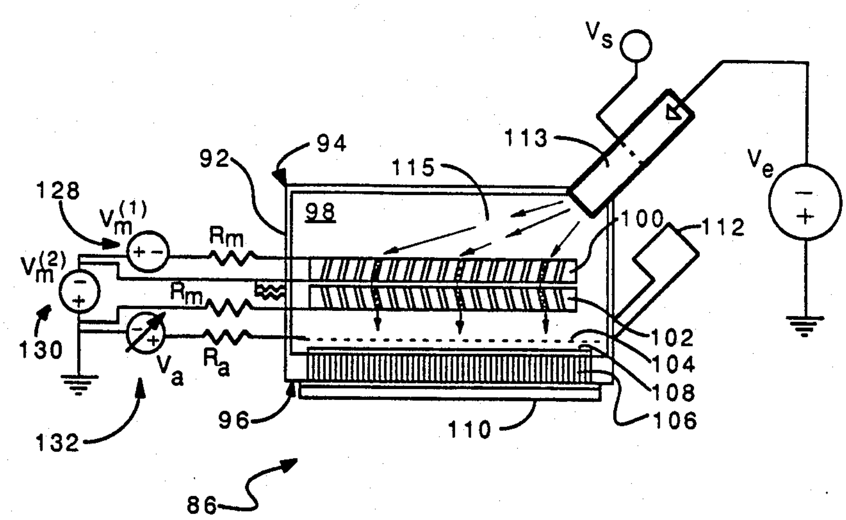
FIG. 6 illustrates in FIGS. 6A through 6C thereof diagrammatic views of a second embodiment of the charge transfer signal processor according to the present invention respectively showing three different input electromagnetic structures.
Figure 6B:
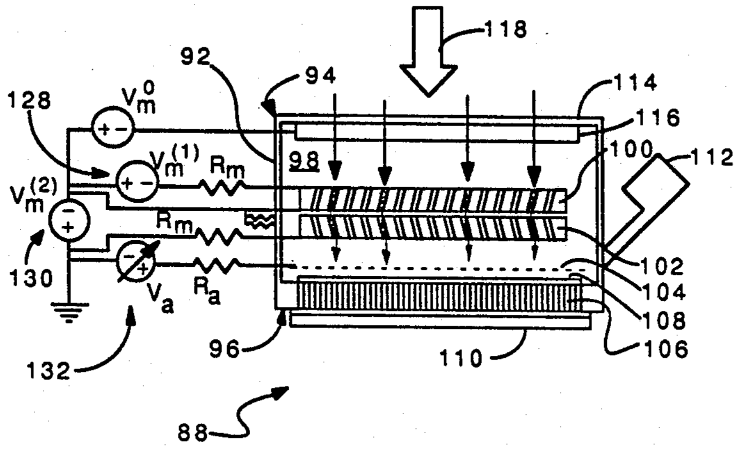
Figure 6C:
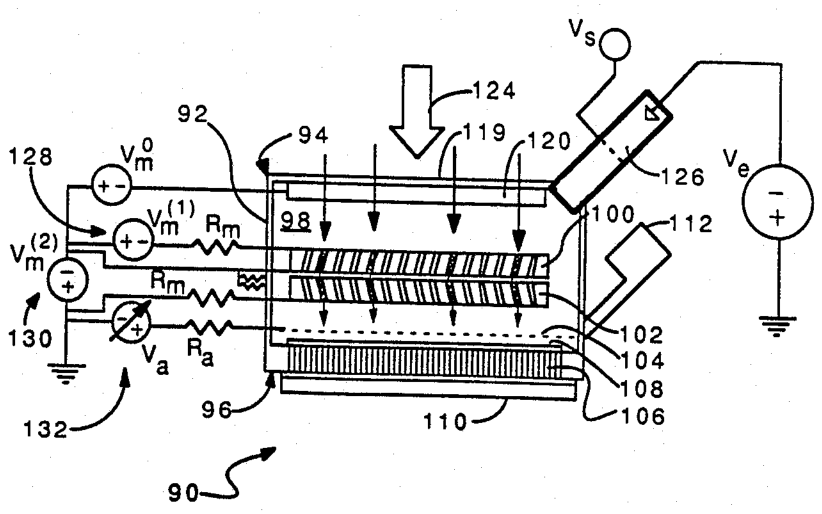

Referring now to FIG. 6, generally designated at 86 in FIG. 6A, at 88 in FIG. 6B, and at 90 in FIG. 6C are three different embodiments of a high-current charge transfer signal processor according to the present invention. Each of the charge transfer signal processors 86, 88, and 90 includes a housing 92 having an upper, generally-circular input face generally designated 94 and a spaced-apart generally-circular bottom output face generally designated 96 defining therebetween a vacuum chamber generally designated 98. A conventional microchannel plate 100 to be described, a subjacent power microchannel plate 102 to be described, and a subjacent acceleration and control grid 104 are provided in the vacuum chamber 98 and intermediate the top and bottom faces 94, 96 of the several high-current charge transfer signal processor 86, 88 and 90. A charge transfer feedthrough plate subassembly 106 having an enhancer coating 108 on its inside 2-D planar face is vacuum-mounted through the bottom face 96 of the several charge signal processor 86, 88, and 90. An output device 110 is mounted externally to the bottom face 96 in the several embodiments. An optional electron gun 112 is vacuum-mounted to the housings 92 for providing an alternate image erasure control.

The high-current charge transfer signal processors 86, 88 and 90 principally differ in the structure of the input write electromagnetic signal excitation source. An electron gun 113 is vacuum-mounted through the top face 94 of the housing 92 of the high-current charge-transfer amplifier 86 in FIG. 6A for providing an input two-dimensional (2-D) electronic signal write source. An optically transmissive window 114 having a deposited photoemissive layer 116 defining a photocathode is vacuum-mounted to the face 94 of the high-current charge transfer signal processor 88 in FIG. 6B. Input write light illustrated by an arrow 118 is transmitted through the window 114, impinges on the photoemissive material 116 and provides a two-dimensional electronic charge distribution that spatially varies with the 2-D spatial intensity distribution of the input write light 118. In FIG. 6C, an optically transmissive window 119 having a deposited photoemissive layer 120 defining a photocathode is vacuum-mounted to the face 94 of the housing 92 of the high-current charge transfer signal processor 90. The photocathode converts the intensity distribution of input write light schematically illustrated by an arrow 124 into a corresponding 2-D electronic charge distribution. An electron write gun 126 is vacuum-mounted to the housing 92 in FIG. 5C. In each of the embodiments of the high-current charge transfer signal processor 86, 88, and 90 of the present invention, biasing and control networks generally designated 128, 130, and 132 are respectively provided for the microchannel plate 100, the power microchannel plate 102, and for the acceleration and control grid 104. A biasing network generally designated 131 and marked "$V_c$" is coupled to the cathodes of the guns 113, 126 and an electron gun input control signal 133 marked "$V_s$" is coupled to the grids of the guns 113, 126 as shown respectively in FIGS. 6A and 6C. Conventional magnetic, electrostatic or electromagnetic techniques are employed in the electron guns 113, 126 for electron beam focus and deflection.

Figure 7:
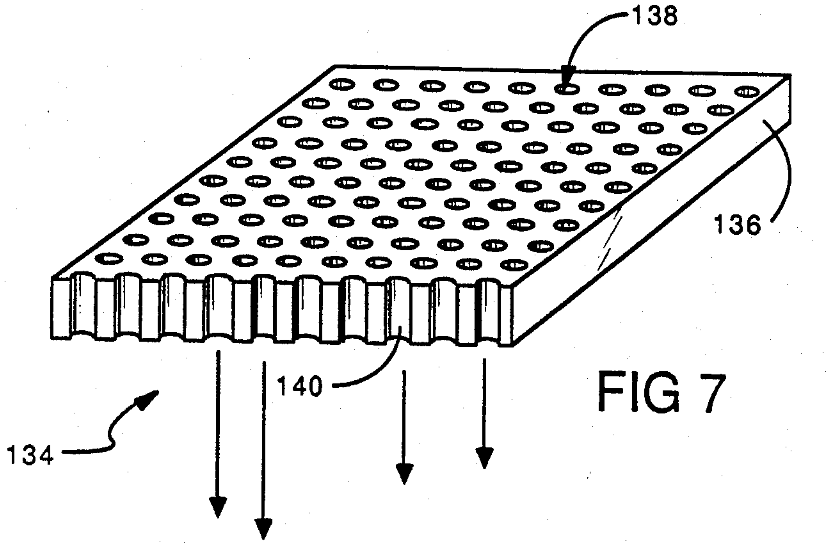
FIG. 7 is a perspective view illustrating a microchannel plate of the charge transfer signal processor according to the present invention.

Referring now to FIG. 7, generally designated at 134 is a fragmentary perspective view illustrating a conventional microchannel plate. The mircrchannel plate 134 includes a glass substrate 136 having an array of closely-spaced continuous dynodes generally designated 138 provided therethrough. Each dynode 138 includes a coating of a high secondary electron emitting substance 140 disposed about its inside wall that is operative in response to each electron incident into the dynode to provide a multiple electron output out of the continuous dynode by a well-known avalanching process. Although an exemplary gain for such microchannel plates may be on the order of ten thousand, the utility of these devices is limited by output-charge-saturation which often restricts the current available from, and the temporal bandwidth of, the conventional microchannel plate subassemblies. A further impediment in the utilization of these devices in some applications is the fact that power is consumed even when electrons are not being extracted therefrom so that it is often the case that an intolerably large quantity of heat is generated.

Figure 8A:
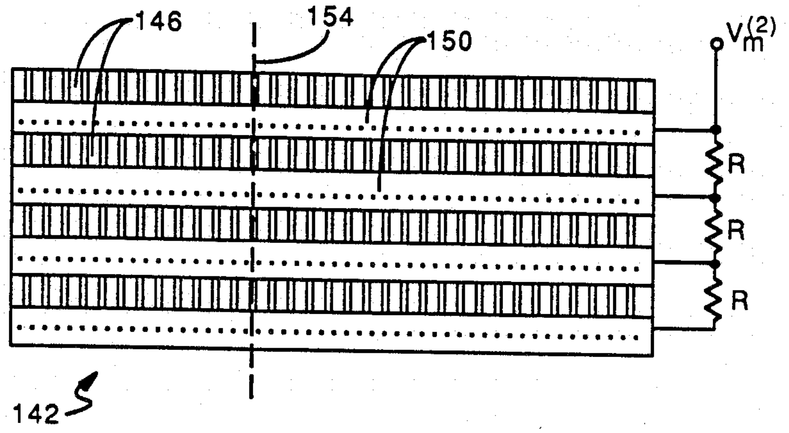
FIG. 8 illustrates in FIG. 8A a side view of and illustrates in FIG. 8B a fragmentary perspective diagram of one embodiment of a power microchannel plate of the charge transfer signal processor according to the present invention.

Referring now to FIG. 8A, generally designated at 142 is a schematic diagram illustrating one embodiment of a power microchannel plate subassembly of the high-current charge transfer signal processor according to the present invention. The power microchannel plate subassembly 142 includes a 2-D array of axially-aligned and spaced-apart plural discrete dynodes. As used herein, the words "discrete dynode" means that the dynodes of an amplification channel to be described are electrically isolated one from the other. A voltage network generally designated 144 and marked "$V_m^{(2)}$,R" is provided for establishing a potential gradient across constitutive axially-aligned discrete dynodes in the 2-D array. The potential gradient provides longitudinal fields through the axially-aligned discrete dynodes of the array that act to accelerate electron transport therethrough and to replace charge as it is depleted by the high-gain secondary electron emission processes therein, so that axially-aligned discrete dynodes of the 2-D array act as high-current electron amplification channels.

Figure 8B:
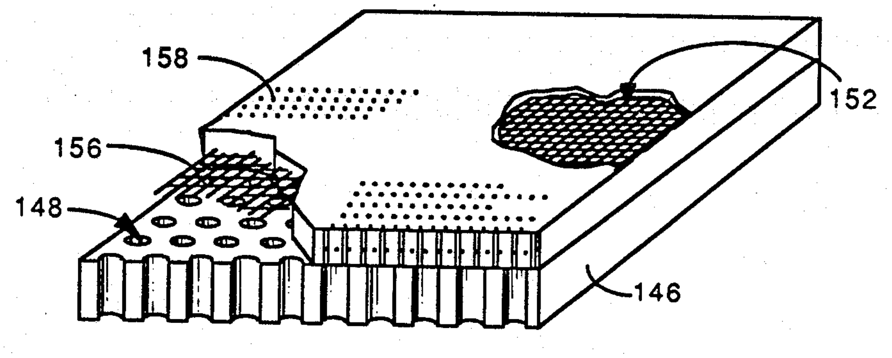

The power microchannel plate subassembly 142 includes a vertical stack of insulative layers 146 having a 2-D aperture pattern therethrough generally designated 148 in FIG. 8B alternating with layers 150 of a high secondary electron emission coefficient conductive material. The layers 150 respectively define 2-D arrays of conductive windows generally designated 152 in FIG. 8B that are cooperative with the apertures of the several layers 146 to provide a 2-D array of high-current electron amplification channels as schematically illustrated by a vertical dashed line 154. The longitudinal alignment of the apertures of the several insulative layers defines plural, cross-talk free channels, which channels thus provide a high-spatial-resolution and thereby preserve the fidelity of the input electromagnetic image. The insulative apertured layers 146 preferably include a glass capillary array, that may have, by way of examle, a 250 micron thickness, an aperture size of between 10 micrometers and 50 micrometers, approximately a 10 micrometer spacings between the edges of adjacent apertures, and from 62,500 to 1,000,000 and more apertures in about a 400 $mm^2$ area. Each of the high secondary electron emission coefficient conductive layers 150 preferably includes a grid of electroformed copper mesh 156 (FIG. 8B) that is coated with a suitable high secondary electron emission coefficient conductive material 158 such as magnesium oxide (MgO). Alternatively, the grid may be fabricated of a high secondary electron emitting conductive material such as Cu:Be. The grid mesh may have an exemplary 5 micrometer thickness with interstitices defining exemplary window sizes of 5 micrometers on 8 micrometers center-to-center spacings. To maximize the yield of secondary electron emission, it is important that the center-to-center spacing of the grid interstices be smaller than the center-to-center spacing of the apertures of the insulative layers 146. The layers 146, 150 are vertically arrayed by any suitable lamination means including, among others, clamping and/or fritting.

Figure 9A:
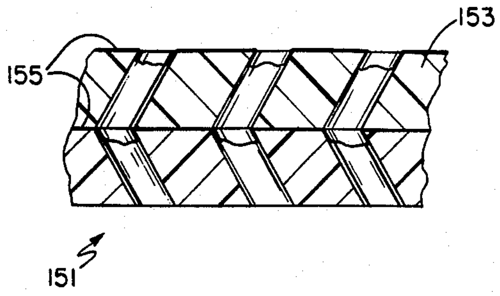
FIG. 9 illustrates in FIG. 9A a side view of and illustrates in FIG. 9B a fragmentary perspective diagram of a further embodiment of the power microchannel plate of the charge transfer signal processor according to a further embodiment of the present invention.
Figure 9B:
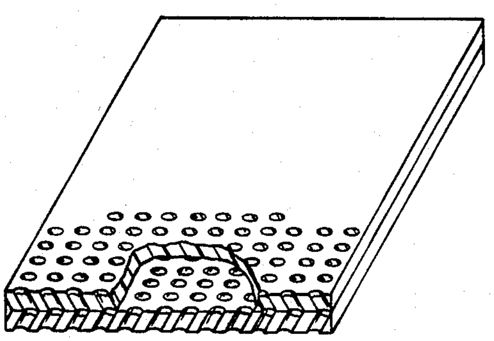

Referring now to FIG. 9A, generally designated at 151 is a sectional view illustrating a further embodiment of a power microchannel plate subassembly of the charge transfer signal processor according to the present invention. The subassembly 151 includes plural, vertically arrayed layers of insulative apertured sheets 153 such as glass capillary arrays. A layer 155 of a high secondary electron emitting conductive material is deposited on the surfaces of each of the apertured sheets 153 so that it extends partway into the aperture. The layers 155 may either be composite or simple. In the former case, a conductive substrate such as silver or aluminum is deposited on the surface of the sheets 153, and an overcoating of a high secondary electron emitting material such as MgO is deposited over the substrate layer. In the latter, a single layer of a high secondary electron emitting conductive material such as Cu:Be is deposited on the several layers 153. The sheets 153 are laminated by any suitable means to provide power microchannel plate subassembly generally designated 157 (FIG. 9B). Incident electrons are multiplied by high-secondary electron emission processes, and are accelerated through the apertures of the several layers by the potential gradient applied thereacross, as in the embodiment of FIG. 8. As charge is depleted, feed charge from the voltage divider network replaces the depleted charge at the rate that the charge is being depleted. The power microchannel plate subassembly 151 therewith provides high-current, non-saturation-limited and cross-talk free amplification through the several constitutive channels thereof.

In the operation of the embodiment of FIG. 6, the input electromagnetic signal 115 in FIG. 6A, 118 in FIG. 6B, and 124, 126 in FIG. 6C is amplified by the respective microchannel plate subassembly 100. Each of the continuous dynodes 138 thereof (FIG. 7) is operative in response to individual incident electrons to provide a large number multiple of the input charge, so that the microchannel plate 100 produces a highly-amplified two-dimensional charge pattern that corresponds to the spatial intensity distribution of the input electromagnetic signal. Each of the axially-aligned discrete dynodes of the power microchannel plate subassembly 102 is operative in response to the output of the confronting dynodes of the microchannel plate subassembly to accelerate the corresponding charge therethrough and to efficiently replace charge as it is depleted therefrom by secondary emission, thereby providing very large output currents without generating heat.

The preselected potential gradient provided by the network "$V_m^{(2)}$" of the power microchannel plate subassembly determines the acceleration of the electrons through the discrete dynode chains thereof and therewith determines their kinetic energy. The potential gradient is preferably selected so as to provide the maximum gain factor of the secondary electron emissive processes in the several constitutive power amplification channels in the several embodiments. The network "$V_m^{(2)}$" feeds charge into the conductive layers thereof at the rate at which charge is depleted in the several axially aligned discrete dynodes by secondary emission. The feed charge migrates to the several axially-aligned discrete dynodes of the several layers and replaces the depleted charge so that each of the axially-aligned discrete dynode chains of the 2-D array acts as a high-current and nonsaturation limited power amplification channel.

The output 2-D high-current signal of the power microchannel plate subassemblies 102 is proximity focused onto the enhancer coatings 108 by the longitudinal fields established by the grids 104, and the charge transfer feedthrough plate assemblies 106 transfer this high-current 2-D electronic charge distribution exteriorly of the housings 92 where it may then be advantageously utilized by any one of a plurality of output devices 110 to be described. As in the embodiment of FIG. 1, the potential applied to the grid 104 is variable to select the gain factor of the enhancer coating 108 which determines operation in either an electron accumulation or an electron depletion write mode.

For an exemplary gain of one thousand from the power microchannel plate subassembly and an exemplary gain of ten thousand from the microchannel plate subassembly, the high-current charge transfer signal processors of the embodiments of FIG. 6 are operable at an exemplary framing rate of 1 kilohertz and with exemplary input irradiance levels in the $10^{-11}$ watts per square centimeter range. If different performance is required, it will be appreciated that an appropriate number of microchannel plate subassemblies and/or power microchannel plate subassemblies, not shown, can with advantage be vertically arrayed in the vacuum chamber 98.

Figure 10:
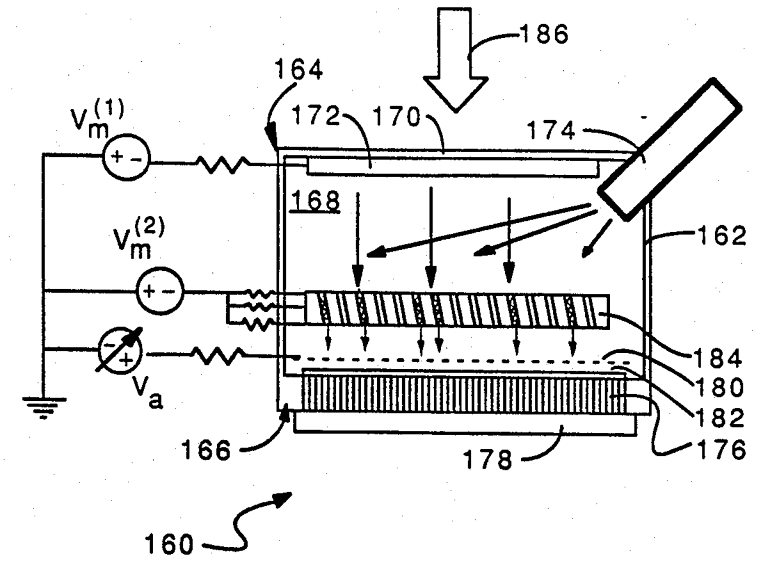
FIG. 10 illustrates a diagrammatic view of a third embodiment of the charge transfer signal processor according to the present invention.

Referring now to FIG. 10, generally designated at 160 is another embodiment of the charge transfer signal processor according to the present invention. The charge transfer signal processor 160 includes a housing 162 having a top input face generally designated 164 and a bottom output face generally designated 166 defining an enclosed vacuum generally designated 168. An optically-transmissive window 170 having a layer of a photoemissive material 172 is vacuum-mounted to the top input face 164. An electron gun 174 is vacuum-mounted to the top input face 164 of the housing 162. A charge transfer feedthrough plate subassembly 176 of the type described above in connection with the description of any one of FIGS. 3, 4 and 5 is vacuum-mounted to the bottom output face 166 of the housing 162. An output device 178 to be described is externally mounted to the exposed face of the charge transfer feedthrough plate subassembly 176. An acceleration grid 180 is provided in the vacuum 168 confronting the charge transfer feedthrough plate assembly 176, and an enhancer coating 182 of the type described above in connection with the description of the embodiments of FIGS. 1 and 6 is disposed on the inside vacuum face of the subassembly 176. A power microchannel plate subassembly 184 of the type described above in connection with the description of either FIG. 8 or FIG. 9 is provided in the vacuum chamber 168 and intermediate the grid 180 and the input face 164. The embodiment of FIG. 10 specifically illustrates a combination electron beam input 174 and a photocathode 172 responsive to input electromagnetic light energy schematically illustrated by an arrow 186 as the input electromagnetic source, although either can be used singly as 2-D input signals, not shown, without departing from the inventive concept.

In the operation of the embodiment of FIG. 10, the input electromagnetic signal is highly current amplified by the power microchannel plate subassembly 184 in the manner described above in connection with the description of FIGS. 8 and 9. The 2-D charge density at the output surface thereof then spatially varies in the same way that the intensity distribution of the input electromagnetic signal varies. This charge distribution is proximity focused onto the enchancer coating 182 by the acceleration and control grid 180, and the charge transfer feedthrough plate subassembly 176 then moves this charge distribution exteriorly of the housing 162 for utilization by any suitable output device 178 to be described. It will be appreciated that other imaging techniques can be employed as well, and that the charge transfer signal processor of FIG. 10 is operable in either an electron accumulation or electron depletion write mode by appropriate selection of the applied grid potential when the enhancer coating 182 is of the efficient secondary electron emission type.

Figure 11A:
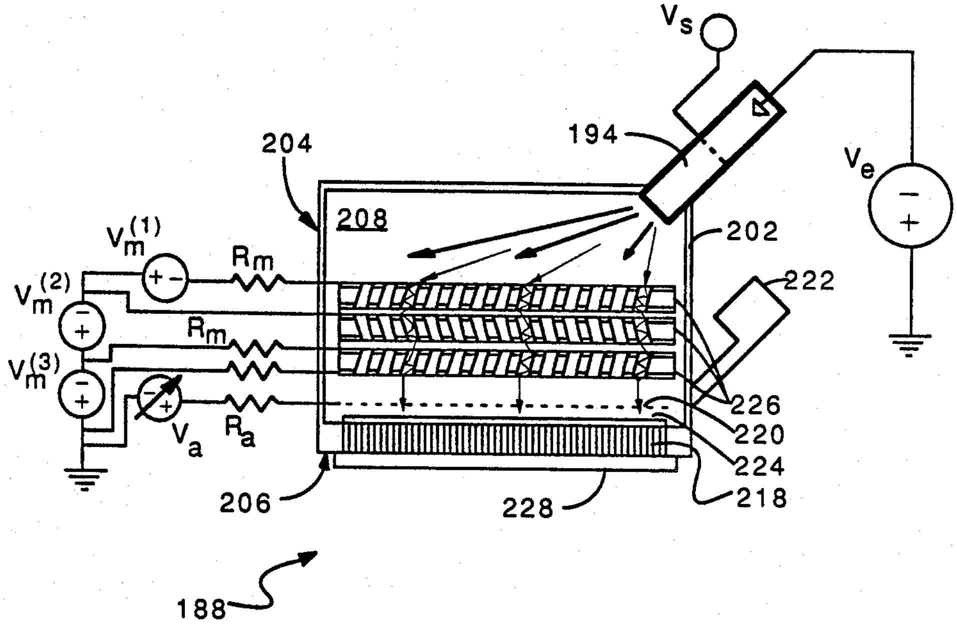
FIG. 11 illustrates in FIGS. 11A, 11B, 11C thereof diagrammatic views illustrating a fourth embodiment of the charge transfer siganl processor according to the present invention respectively showing three different input electromagnetic structures.
Figure 11B:
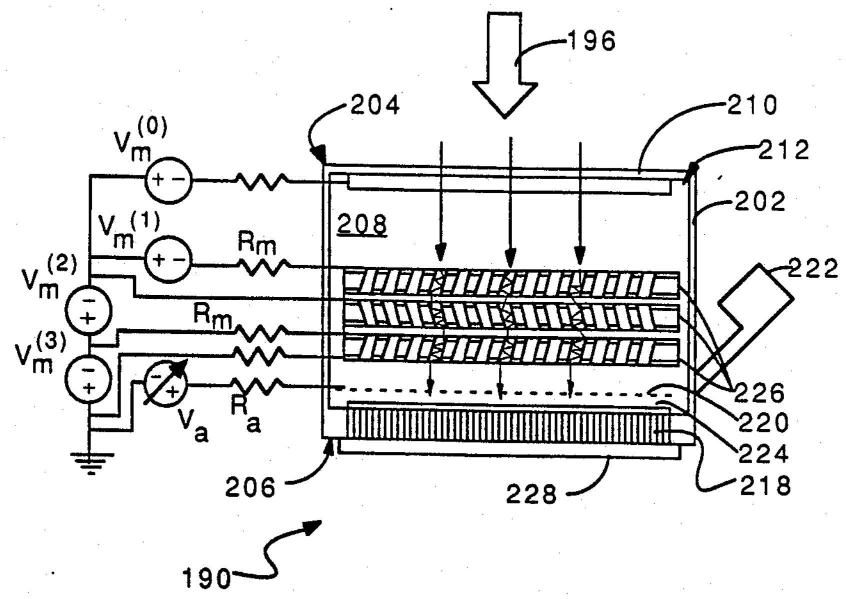
Figure 11C:
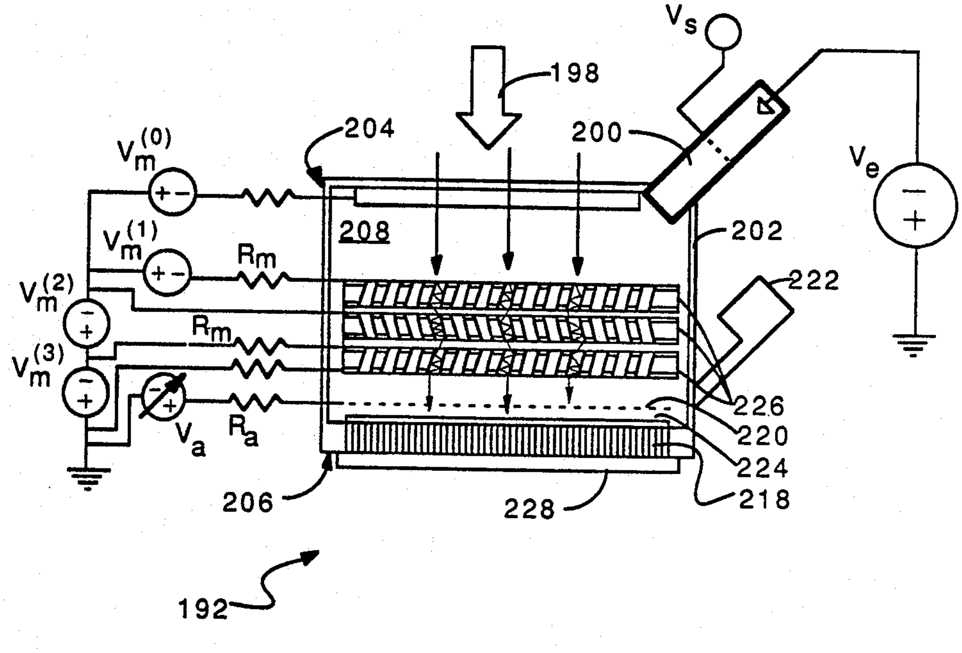

Referring now to FIG. 11, generally designated at 188 in FIG. 11A, at 190 in FIG. 11B, and at 192 in FIG. 11C are high-gain charge transfer signal processors according to the present invention. The charge transfer signal processors 188, 190, 192 are substantially identical to each other, and principally differ in the structure of the input electromagnetic signal excitation source. In FIG. 11A, high-resolution, low-current electron gun 194, in FIG. 11B an input electromagnetic write light source schematically illustrated by an arrow 196, and in FIG. 11C a combination of an input electromagnetic write light source 198 and an electron gun 200 are provided. Each of the high-gain charge transfer signal processors 188, 190, 192 includes a housing 202 having a generally planar top input face generally designated 204 and a generally planar bottom output face generally designated 206 defining an enclosed vacuum 208. The electron gun 194 is vacuum-mounted to the top face 204 of the high-gain charge transfer signal processor 188 in FIG. 11A, an optically transmissive window 210 having a subjacent deposited photoemissive layer 212 is vacuum-mounted to the face 204 of the high-gain charge transfer signal processor 190 in FIG. 11B, and an optically transmissive window 214 having a subjacent deposited photoemissive layer 216 is vacuum-mounted to the top face 204 of the high-gain charge transfer signal processor 192 of FIG. 11C.

Each of the embodiments 188, 190, 192 includes a charge transfer feedthrough plate subassembly 218 of the type described above that is vacuum-mounted to the bottom face 206 of the housing 202, an acceleration and control grid 220 in the enclosed vacuum 208 and confronting the interior vacuum surface of the charge transfer feedthrough plate subassembly 218, and an optional electron erase source 222 vacuum-mounted to the side of the corresponding housings 202. The gun 222 floods the interior surface of the charge transfer feedthrough plate subassemblies 218 with electrons for erasure of the charge distribution thereon during operation in the framed mode. An electron enhancer coating 224 of the type described above is disposed on the interior planar surface of the charge transfer feedthrough plate subassembly 224 of the several embodiments.

One or more conventional microchannel plate subassemblies 226, three being specifically illustrated, are disposed in the vacuum chamber 208 of the several high-gain charge transfer signal processors 188, 190, 192. The 2-D input electromagnetic signal, as written by the e-beam gun 194 in FIG. 11A and as photoelectrically converted by the photocathode 212 in the embodiments of FIGS. 11B, 11C, is amplified by the one or more microchannel plates 226 by the well-known process of secondary electron emission therethrough in the several embodiments and in such a way that the 2-D charge distribution cascades through the several microchannel plates and is successively amplified thereby. The acceleration and control grids 220 proximity focus the amplified 2-D charge distribution produced at the output of the several microchannel plates onto the enhancer coating 224, which charge is then fed through the corresponding electrically-isolated conductors of the corresponding charge transfer feedthrough plate subassemblies and is thereby made available externally of the associated charge transfer signal processors. An output device 228 is provided externally of the bottom face 206 of the housings 202 for utilization of the output, highly-amplified, 2-D electronic charge distribution.

Figure 12:
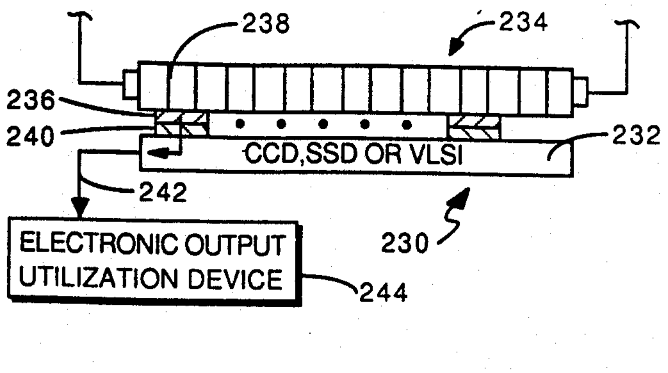
FIGS. 12 through 23 are pictorial diagrams respectively illustrating different output devices of the charge transfer signal processor according to the present invention.

Referring now to FIG. 12, generally designated at 230 is an enlarged schematic view illustrating an output device that is operative to electronically read the 2-D output charge pattern of the charge transfer signal processors of the present invention. An output parallel-to-serial convertor 232, such as a charge coupled device, a switched silicon device, or a very large scale integrated circuit, is mounted to the charge transfer feedthrough plate subassembly generally designated 234 of any of the embodiments of the above-described charge transfer signal processors. Preferably, preselected ones of the electrically-isolated conductors 238 of the feedthrough plate subassembly 234 are bump-bonded as at 236 to one or more corresponding contact pads 240 on the electronic serializer device 232. The serializer 232 is operative in response to the two-dimensional output charge pattern available at the conductors 238 to provide a serial readout thereof as schematically illustrated by an arrow 242. The serial readout may then be input to an electronic or other output utilization device 244.

Figure 13:
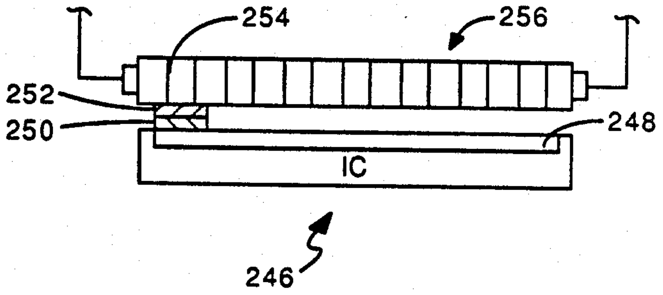

Referring now to FIG. 13, generally designated at 246 is a schematic diagram illustrating an output device that is operative to directly read an input 2-D electromagnetic signal into itself of any of the embodiments of the above-described charge transfer signal processor. An integrated circuit 248 having contact pads 250 is bumped-bonded as at 252 to preselected ones of the conductors 254 of the charge transfer feedthrough plate subassembly generally designated at 256. As will readily be appreciated, the charge transfer signal processors of the present invention in this manner are operable as an interface for directly writing the 2-D input electromagnetic signal energy into the integrated circuit or other device such as for high-speed, real-time, 2-D signal processing.

Figure 14:
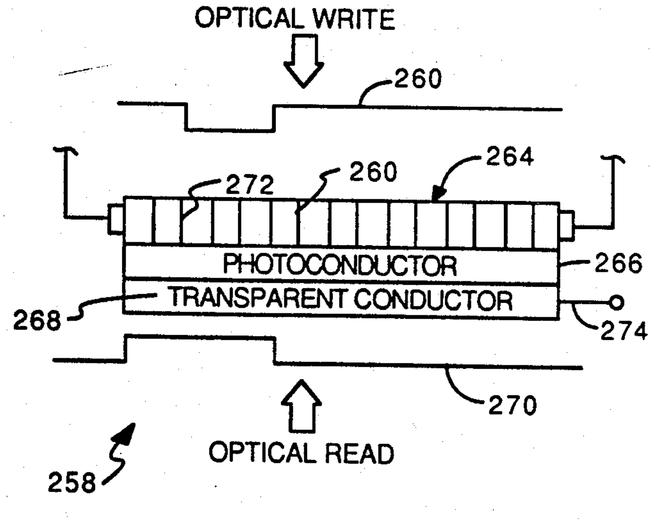

Referring now to FIG. 14, generally designated at 258 is a schematic diagram illustrating an output device that is operative with an optical read control signal for selected positional read-out of the electronic charge distribution on the conductors 272 of the charge transfer feedthrough plate subassembly 264. The intensity of this electronic charge distribution is schematically illustrated by a curve 260. A photoconductor 266, such as silicon, is mounted to the external face of the charge transfer feedthrough plate assembly 264. A transparent electrode 268 is mounted to the photoconductor 266. An optical read control signal whose intensity is designated by a curve 270 is applied to selected regions of the exposed transparent conductor 268 and photoconductor 266 on the charge transfer feedthrough plate subassembly 264. As will be appreciated, the illuminated regions of the photoconductor 266 and transparent conductor 268 are conductive so long as the read control signal is present. The charge on the corresponding conductive filaments 272 then passes through the reduced resistance of the illuminated regions of the photoconductor 266 to the transparent conductor 268, from which it is readout over an output line 274. By controlling the optical read control signal, two-dimensional signal processing of the input 2-D electromagnetic signal is realizable in real-time, such as image centroid detection, correlation, and image detection and analysis.

Figure 15:
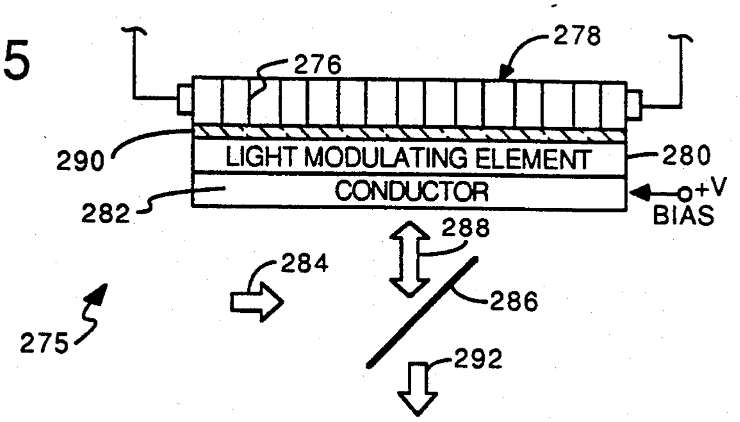

Referring now to FIG. 15, generally designated at 275 is a schematic diagram generally illustrating an output device that is operative as a spatial light modulator in any of the several embodiments of the charge transfer signal processor of the present invention. As used herein, the term spatial light modulation designates either spatial phase or spatial amplitude modulation. The electronic charge distribution present on the filaments 276 of the charge transfer feedthrough plate subassembly generally designated 278 produce longitudinally varying electric fields in regions of a light modulating element 280 mounted to the external face of any one of the embodiments of the charge transfer signal processors of the present invention. A transparent electrode 282 is provided over the light modulating element 280. An output 2-D optical readout signal schematically illustrated by an arrow 284 is deviated off a beam splitter 286 and, as is illustrated by a double-headed arrow 288, it is deviated thereof onto the light modulating element 280. A mirror 290, which may be provided to either surface of the light modulator element 280, in dependence on the light modulating properties of the light modulating element to be described, reflects it back through the beam splitter 286 as shown by the arrow 288. The phase and/or the amplitude of the 2-D output light as illustrated by an arrow 292 is thereby locally modified, and in proportion with the way that the light modulating element 280 has been locally changed by the electronic charge distribution present on the external face of the charge transfer feedthrough plate subassembly. As will be appreciated, the spatial light modulator is especially useful in applications calling for high-bandwidth, real-time adaptive optics, in applications calling for ultra-high resolution, high-speed, and sensitivity to low-light-levels; and in optical computing applications; among others.

Figure 16:
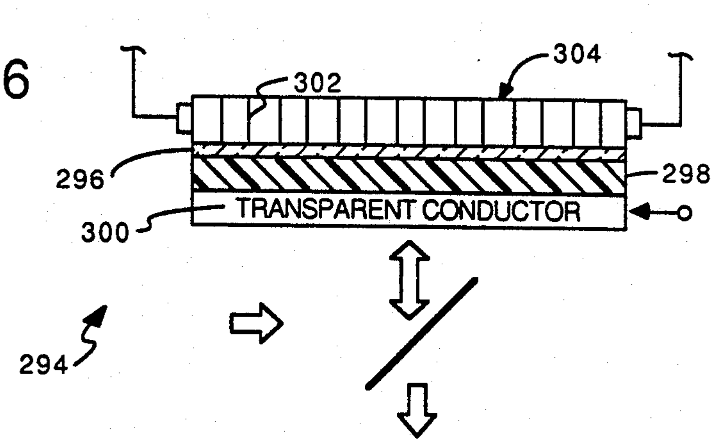

Referring now to FIG. 16, generally designated at 294 is a schematic diagram illustrating one embodiment of a light modulating element useful as a spatial light modulator with any of the embodiments of the charge transfer signal processors of the present invention. It includes an insulative, dielectric mirror 296, and an electro-optic material 298 disposed thereon. The electro-optic material may be, for example, such organic polymers or crystals as MNA, such inorganic crystals as $LiNbO_3$ or KDP, such amorphous structures as poled PLZT and electroabsorptive materials, among others, known to those skilled in the art. A transparent conductor 300 is disposed over the electro-optic material 298. As in the embodiment of FIG. 15, the charge distribution present on the conductors 302 of the charge transfer feedthrough plate subassembly generally designated 304 produces longitudinally varying electric fields through the orgainic, inorganic, electro-absorptive, and/or amorphous electro-optic materials 298. The effective optical path length and/or the optical absorption of the electro-optic material 298 locally varies in response to the varying field strength such that the spatial phase and/or amplitude of an output signal deviated off the layer 298 locally varies in accordance with the modulation of the associated region of the layer.

Figure 17:
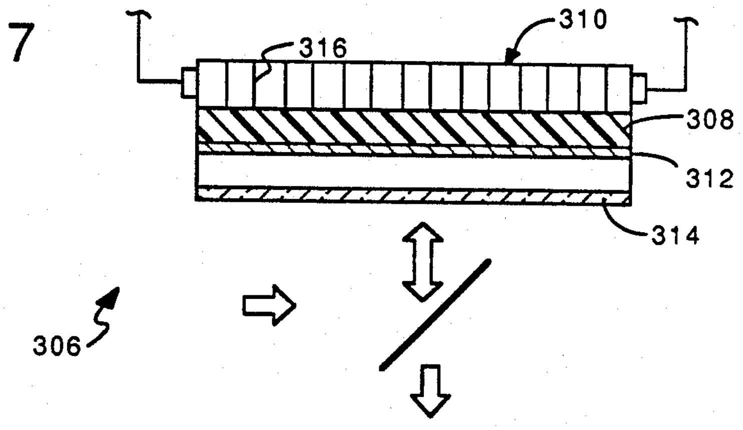

Referring now to FIG. 17, generally designated at 306 is another embodiment of the light modulating element useful as a spatial light modulator according to the present invention. The modulator 306 includes a layer of an elastomer such as a rubber 308 mounted to the exposed face of the charge transfer feedthrough plate subassembly generally designated 310, and a reflective conductor 312 such as indium is provided on the exposed surface of the elastomer 308. A window 314 is provided exteriorly of the deposited reflective conductor 312. The electronic charge variation on the conductors 316 of the charge transfer feedthrough plate subassembly 310 produces longitudinally varying electric fields through the elastomer 308, which locally changes its mechanical dimensions accordingly, so as to provide spatial light modulation of the output light deviated thereoff.

Figure 18:
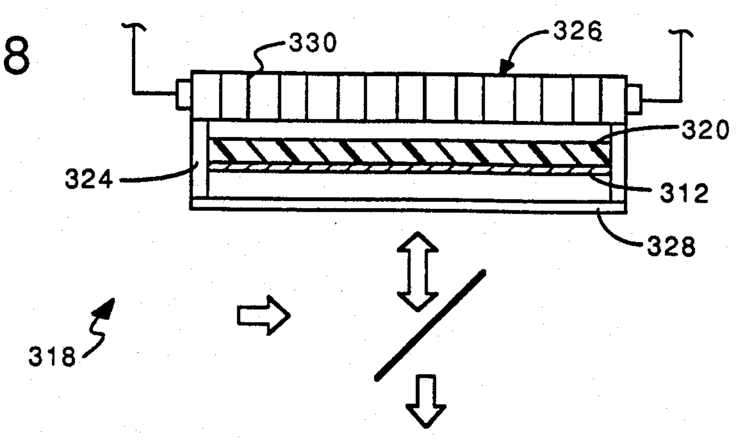

Referring now to FIG. 18, generally designated at 318 is another embodiment of a light modulating element useful for spatial light modulation according to the present invention. The modulator 318 includes as the electro-optic device a membrane 320 such as nitrocellulose having a deposited reflective conductor 322 such as indium that is suspended in a housing 324 and mounted to the exposed face of the charge transfer feedthrough plate subassembly generally designated 326. A window 328 is mounted to the housing 324. The spatially varying electric fields produced by the electronic charge distribution on the conductors 330 of the charge transfer feedthrough plate subassembly 326 locally displace the membrane 320, and therewith the reflective conductor 322 deposited thereon. The different positions of the conductor thereby locally modulate the phase of the output two dimensional light signal deviated thereoff.

Figure 19:
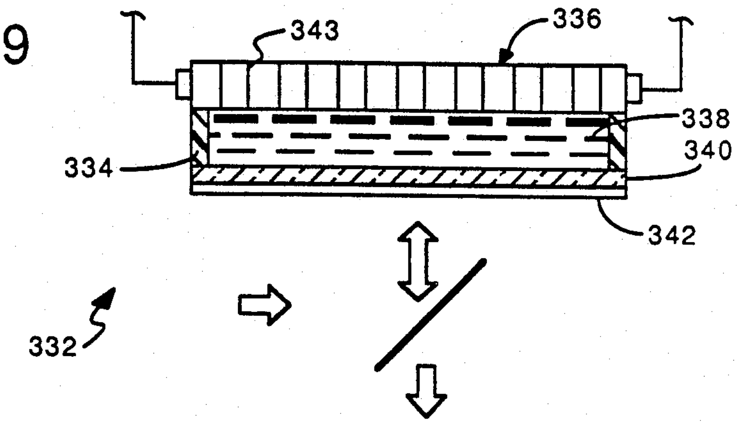

Referring now to FIG. 19, generally designated at 332 is another embodiment of a light modulating element useful for spatial light modulation according to the present invention. A housing 334 is mounted to the exposed face of the charge transfer feedthrough plate subassembly generally designated 336, and a reservoir of electro-optic responsive liquid 338, such as liquid crystals, polar molecules, and electro-absorptive liquids, is provided in the housing 334. A transparent electrode 340 and an optically transparent window 342 are provided at the exposed face of the housing 334. The electronic charge distribution present on the conductors 343 of the charge transfer feedthrough plate subassembly 336 again provide longitudinal electric fields that vary through the liquid material 338, locally changing its optical properties, such that the phase and/or amplitude of an output two dimensional light signal deviated thereoff is modulated in accordance with the way the optical properties of the liquid locally change in response to the varying electric field produced by the intensity distribution of the 2-D input electromagnetic signal.

Figure 20:
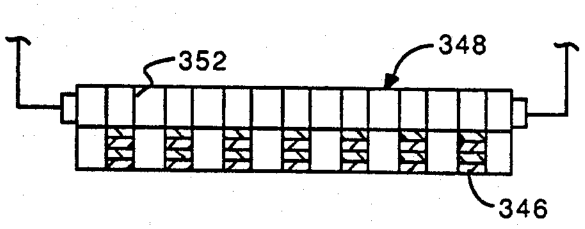

Referring now to FIG. 20, generally designated at 344 is a schematic diagram illustrating another electro-optic element useful as a spatial phase light modulator according to the present invention. The modulator 344 includes discrete stacks of selectably-biased piezoelectric elements 346 mounted to the exposed face of the charge transfer feedthrough plate subassembly generally designated 348, and a reflective conductor 350 disposed across the exposed surface of the stacks of the piezoelectric elements 346. Again, the spatially varying electric fields produced by the electronic charge distribution on the conductors 352 of the charge transfer feedthrough plate subassembly 348 change the mechanical characteristics of the stacks of the piezoelectric elements 346 locally across the two-dimensional output surface of the charge transfer feedthrough subassembly such that the phase of an output 2-D light signal deviated off of the reflective conductor 350 is spatially modulated locally thereby.

Figure 21:
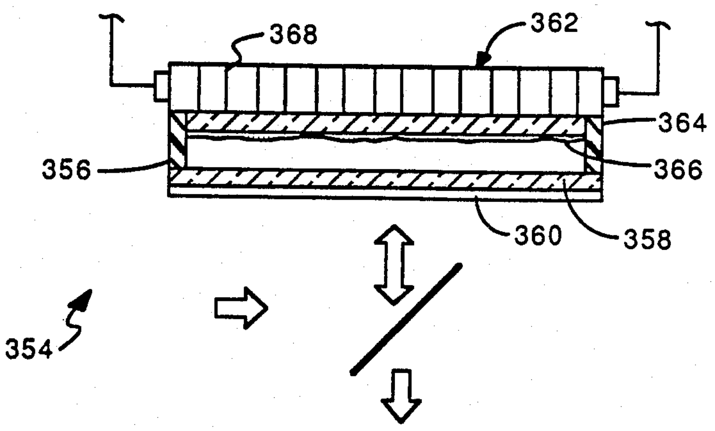

Referring to FIG. 21, generally designated at 354 is a schematic diagram illustrating another embodiment of an electro-optic element useful as a spatial phase light modulator according to the present invention. A housing 356 having a transparent electrode 358 and an outer optically transparent window 360 is mounted to the exposed face of the charge transfer feedthrough plate subassembly generally designated 362. The interior of the housing 356 is maintained at an inert atmosphere, a dielectic mirror 364 is provided therein confronting the exposed external face of the charge transfer feedthrough plate subassembly 362, and a film of a transparent liquid 366, such as an oil, is disposed on the dielectic mirror 364. The thickness of the oil film 366 varies as the electronic charge distribution present on the conductors 368 of the charge transfer feedthrough plate subassembly 362 varies, which again provides 2-D spatial phase light modulation of an output light signal passing through the oil film.

Figure 22:
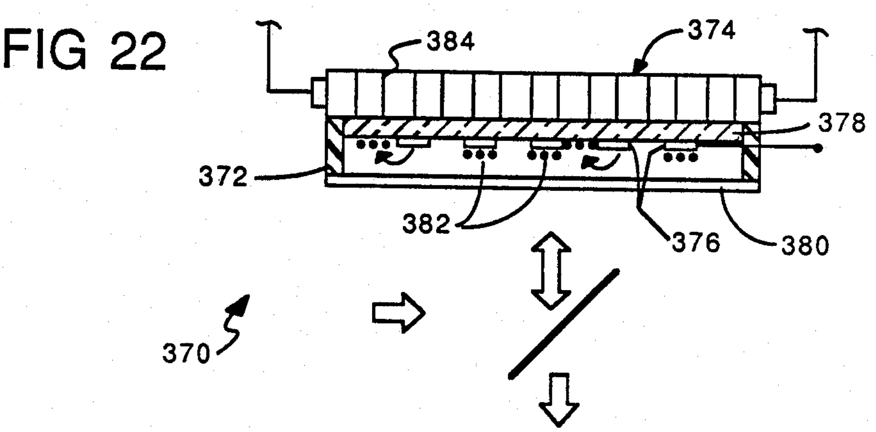

Referring now to FIG. 22, generally designated at 370 is a schematic diagram illustrating an electro-optic element useful as a light modulator according to the present invention. A housing 372 is mounted to the exposed face of the charge transfer feedthrough plate subassembly generally designated 374, and an electrically conductive grid 376 is mounted on an insulative mirror 378 and coupled to the charge transfer feedthrough plate subassembly 374. A window 380 is mounted to the housing 372, and a source of opaque toner particles 382 is provided in communication with the inside of the housing 372. In response to the charge pattern present on the electrical conductors 384 of the charge transfer feedthrough plate subassembly 374, the toner particles locally move between the grid 376 and the exposed surface of the dielectric mirror 378. The reflectivity of the mirror 378 locally varies as the toner particles density varies, so that an output light beam reflected off the mirror 378 has its intensity spatially modulated locally to the degree that the toner particles, as determined by the corresponding local electric field strengths, are either present or are absent on corresponding regions of the dielectic mirror.

Figure 23:
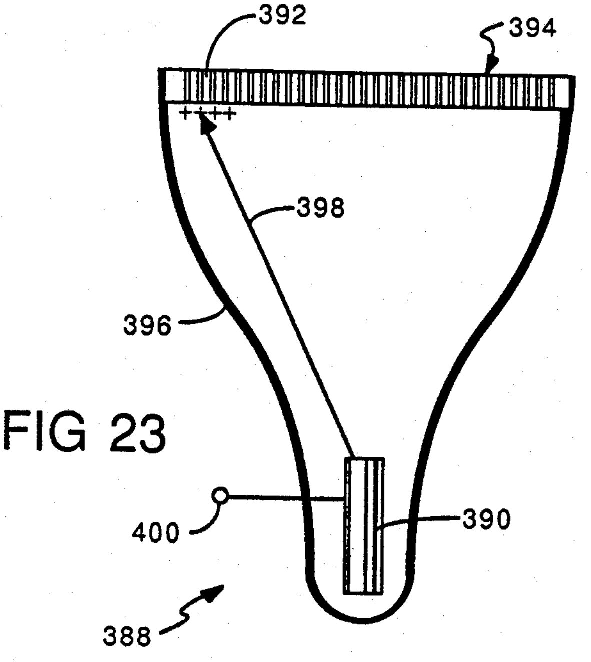

Referring now to FIG. 23, generally designated at 388 is a schematic diagram illustrating another output device for any of the embodiments of the charge transfer signal processor according to the present invention. An electron gun assembly 390 operated in the so-called Vidicon mode is vacuum-mounted to the back face of the housing in position to scan the 2-D array of conductors 392 of the charge transfer feedthrough plate subassembly generally designated 394. The electron gun assembly 390 includes beam deflection components operable in a wellknown manner to scan the 2-D array of conductors 392 as schematically illustrated by a ray 398. As will be appreciated, the magnitude of the beam current varies in dependence on the local charge density present on the conductors of the feedthrough plate subassembly. The beam current is monitored as illustrated at 400 to provide a signal indication of the output 2-D electronic charge intensity distribution.

Other electrical, optical, and/or electromechanical output devices, among others, can advantageously be utilized. The foregoing description of the presently preferred output devices is not exhaustive but rather is exemplary of the kind and of the range of the possible technology opened by the present invention. For example, because heat that is generated by the selected output device is readily externally removable, high-power output devices may be selected. Again, because the selected output device is externally mountable to the housings output devices that are not vacuum-compatible may be selected. Other output devices and charge transfer signal processor embodiments will become apparent to those skilled in the art without departing from the scope of the appended claims.

What is claimed is:

1. A charge transfer signal processor, comprising:
vacuum housing means defining longitudinally spaced and confronting two-dimensional input and output external ports for providing an evacuated region between the external input and output ports;
input electromagnetic signal means coupled to said vacuum housing means for writing an input electromagnetic signal defining a two-dimensional (the 2-D) spacially-varying input intensity distribution into the evacuated region as a selectable two-dimensional spacially-varying electronic charge intensity distribution;
imaging means for transporting said selectable two-dimensional spacially-varying electronic charge intensity distribution of said input electromagnetic signal proximate to said output port; and
two-dimensional electronic charge collecting and electrically conductive feedthrough means vacuum-mounted at said external output port to said vacuum housing means and cooperative with said imaging means for receiving said two-dimensional electronic charge intensity distribution proximate said output port and electrically transferring it externally of said vacuum housing means;
said two-dimensional electronic charge collecting said electrically conducting feedthrough means including a preselected high resolution 2-D array of electrically isolated longitudinally extending conductors having ends terminating in first and second surfaces, with the ends terminating in said first surface being located inside said evacuated region confronting said input port, and with the ends terminating in said second surface being located outside said evacuated region and facing externally of said vacuum housing means;
said preselected resolution of said high resolution 2-D array being selected to substantially preserve the fidelity of the input 2-D electromagnetic signal;
said 2-D electronic charge intensity distribution being locally received by said ends of said two dimensional electronic charge collecting and electrically conductive feedthrough means terminating in said first surface of said high-resolution 2-D array of electrically isolated and longitudinally extending conductors and individually electrically transferred thereby to associated ones of the ends thereof terminating in said second surface of said high-resolution 2-D array of electrically isolated longitudinally extending conductors of said feedthrough means so as to provide at said second ends and externally of the housing an electrical 2-D output signal having a spacially varying output intensity distribution corresponding to that of the input electromagnetic signal.

2. The charge transfer signal processor of claim 1, wherein said input electromagnetic signal means includes an electron gun vacuum-mounted proximate said external input port of said vacuum housing means.

3. The invention of claim 1, wherein said input electromagnetic signal means includes an optically transmissive window vacuum-mounted at said external input port of said vacuum housing means, and a layer of a photo-emissive material disposed on said window and on the side thereof confronting the evacuated region of said vacuum housing means.

4. The charge transfer signal processor of claim 1, wherein said input electromagnetic signal means includes an electron gun vacuum-mounted to said vacuum housing means; and further includes an optically transmissive window vacuum-mounted to said external input port of said vacuum housing means and a layer of a photoemissive material deposited on the surface of said window confronting the evacuated region of said vacuum housing means.

5. The charge transfer signal processor of claim 1, wherein said imaging means includes means for establishing an electric field in said evacuated region of said vacuum housing means.

6. The charge transfer signal processor of claim 5, wherein said electric field establishing means includes an acceleration grid for providing said longitudinally extending electric fields.

7. The charge transfer signal processor of claim 1, wherein said imaging means includes means for establishing a magnetic field in said evacuated region of said vacuum housing means.

8. The charge transfer signal processor of claim 1, wherein said imaging means includes means for providing electromagnetic fields in said evacuated region of said vacuum housing means.

9. The charge transfer signal processor of claim 1, further including a coating of a high-charge gain enhancer coating disposed on said ends of said 2-D array of electrically-isolated elongated conductors that terminate in said first surface thereof.

10. The charge transfer signal processor of claim 1, wherein said 2-D array of electrically-isolated elongated conductors is constituted as a lamination of insulative substrates each having spaced-apart and generally-parallel conductive filaments disposed on a surface thereof.

11. The charge transfer signal processor of claim 10, wherein said insulative substrates are glass substrates, and wherein said conductive filaments are photolithographically-deposited metalization traces.

12. The charge transfer signal processor of claim 9, further including means coupled to said vacuum housing means for erasing electronic charge on said enhancer coating.

13. The charge transfer signal processor of claim 1, wherein said collecting and feedthrough means is constituted as an apertured electrically insulating plate having an electrically conductive material disposed in the apertures thereof.

14. The charge transfer signal processor of claim 13, wherein said apetured plate includes a glass capillary array, and wherein said conductive material is a metal.

15. The charge transfer signal processor of claim 1, wherein said two-dimensional charge collecting and feedthrough means includes plural drawable longitudinally extending filaments each constituted as an outer insulative sheath and an inner conductive core.

16. The charge transfer signal processor of claim 15, wherein each of said filaments include a glass sheath and a drawable conductive glass core.

17. The charge transfer signal processor of claim 15, wherein each of said filaments includes an outer glass sheath and an inner conductive flowable metal.

18. The charge transfer signal processor of claim 1, further including a microchannel plate subassembly operatively disposed in said evacuated region of said vacuum housing means intermediate said input port thereof and said collecting and feedthrough means.

19. The charge transfer signal processor of claim 1, further including means disposed in said evacuated region of said vacuum housing means intermediate said input port thereof and said collecting and feedthrough means for providing current amplification of said two-dimensional electronic charge distribution of said input electromagnetic signal.

20. The charge transfer signal processor of claim 19, wherein said current amplification means includes a power microchannel plate.

21. The charge transfer signal processor of claim 20, wherein said power microchannel plate includes a 2-D array of cross-talk free channels each containing plural discrete dynodes.

22. The charge transfer signal processor of claim 21, wherein said 2-D array of said power microchannel plate is constituted as a lamination of high-efficiency secondary electron emitting conductive layers and alternating apertured insulative layers.

23. The charge transfer signal processor of claim 22, wherein said emitting conductive layers include an electrically conductive grid defining interstitices, and a layer of a high secondary electron emitting conductive material disposed onto said grid.

24. The charge transfer signal processor of claim 22, wherein said emitting conductive layers include a grid of a secondary electron emitting conductive material.

25. The charge transfer signal processor of claim 21, wherein said power microchannel plate is constituted as a stack of high secondary electron emitting conductive material coating apertured insulative layers.

26. The charge transfer signal processor of claim 25, wherein said high secondary electron emitting conductive material is composite.

27. The charge transfer signal processor of claim 26, wherein said composite material includes a layer of a conductive material and an overlaid layer of a high secondary electron emitting material.

28. The charge transfer signal processor of claim 26, wherein said high secondary emission conductive material is single.

29. The charge transfer signal processor of claim 28, wherein said single material is a high secondary electron emitting conductive layer.

30. The charge transfer signal processor of claim 22, further including means for applying a potential gradient across the lamination of the several high-efficiency secondary electron emitting conductive layers.

31. The charge transfer signal processor of claim 25, further including means for applying a potential gradient across said stack of high secondary electron emitting conductive material coated apertured insulative layers.

32. The charge transfer signal processor of claim 20, wherein said high secondary electron emitting conductive material is magnesium oxide.

33. The charge transfer signal processor of any one of claims 10, 13, 15, or 19, further including an output device mounted to said ends of said 2-D array of electrically-isolated and longitudinally extending conductors that terminate in said second plane external of said vacuum housing means.

34. The charge transfer signal processor of claim 33, wherein said output device includes an electronic circuit having contacts that are electrically connected to preselected ones of the conductors of the 2-D array of the electrically-isolated and longitudinally extending conductors that lie in said second plane external to said vacuum housing means.

35. The charge transfer signal processor of claim 33, wherein said electronic circuit is an electronic parallel-to-serial converter.

36. The charge transfer signal processor of claim 34, wherein said electronic circuit is an integrated circuit.

37. The charge transfer signal processor of claim 33, wherein said output device includes a two-dimensional photo-conductor mounted to the ends of the 2-D array of conductors that terminate in said second external plane, a two-dimensional transparent conductor mounted to said photo-conductor, and means for selectively illuminating different regions of said photo-conductor through said transparent conductor for providing a read control output signal.

38. The charge transfer signal processor of claim 33, wherein said output device includes a two-dimensional light modulating element and a conductor operatively mounted to the ends of the conductors of the 2-D array that terminate in said second external plane in such a way that the light modulating element is responsive to the electric fields produced by the electronic charge distribution thereon.

39. The charge transfer signal processor of claim 38, wherein said light modulating element includes an electro-optic material.

40. The charge transfer signal processor of claim 39, wherein said electro-optic material includes organic crystals.

41. The charge transfer signal processor of claim 39, wherein said electro-optic material includes inorganic crystals.

42. The charge transfer processor of claim 39, wherein said electro-optic material includes a transparent ceramic.

43. The charge transfer signal processor of claim 38, wherein said light modulating element includes an electro-absorptive material.

44. The charge transfer signal processor of claim 38, wherein said light modulating element includes an elastomer.

45. The charge transfer signal processor of claim 38, wherein said light modulating element includes a flexible membrane.

46. The charge transfer signal processor of claim 45, wherein said membrane is nitrocellulose.

47. The charge transfer signal processor of claim 38, wherein said light modulating element includes liquid crystals.

48. The charge transfer signal processor of claim 38, wherein said light modulating element material includes an oil film.

49. The charge transfer signal processor of claim 33, wherein said output device includes an electrically addressable conductive grid, and means for applying opaque toner particles onto said grid.

50. The charge transfer signal processor of claim 38, wherein said output device includes a piezoelectric device.

51. The charge transfer signal processor of claim 50, wherein said piezoelectric device is constituted as several stacks of plural laminations of a piezoelectric material.

52. The charge transfer signal processor of claim 33, wherein said output device includes an electron gun operation in the Vidicon mode.

53. A high spacial resolution, high-current gain, power microchannel plate assembly, comprising:

means for providing a two-dimensional array of high-efficiency, secondary electron emitting discrete dynode chains that each define an electron amplification channel and that together define a cross-talk free and high spacial-resolution high-current two-dimensional charge amplifier; and means coupled to the two-dimensional array of high-efficiency, secondary electron emitting discrete dynode chains for applying a potential gradient across the constituative discrete dynodes of each of the chains of dynodes to control the electron amplification of the channels and for feeding charge into the constituative dynodes of each chain of dynodes to provide high-current and non-saturation-limited electron amplification channels;

said array providing means including a lamination of first layers of high-efficiency secondary electron emitting conductive grids defining a 2-D array of conductive windows alternating with second layers of apertured insulative sheets, with the windows of the grids longitudinally alternating with the apertures of the apertured insulative sheets to provide said two-dimensional charge amplifier.

54. The power microchannel plate subassembly of claim 53, wherein said potential gradient applying means includes a voltage divider network connected to each of the several first layers of the high-efficiency secondary electron emitting conductive grids.

55. A high spacial-resolution charge transfer feedthrough plate subassembly for a charge transfer signal processor, comprising:

plural longitudinally extending electrically conductive members;

means coupled to said members for supporting said members in a high-spacial resolution two-dimensional array in such a way that each of the conductors is electrically isolated from all of the other conductors in the two-dimensional array; and means cooperative with said supporting means for providing vacuum-tight sealing between all of the electrically conductive and mutually electrically isolated conductors of the two-dimensional array;

said conductive members are mutually parallel metallic traces disposed in spaced apart relation on one surface of each of plural insulative sheets that are laminated together in a vacuum-tight sealing relation.

56. The power microchannel plate assembly of claim 53, wherein the conductive windows of the grids define a center-to-center spacing and the apertures of the apertured insulative sheets define a center-to-center spacing, the center-to-center spacing of the conductive windows being smaller than the center-to-center spacing of the apertures of the insulative sheets to maximize the secondary electron emitting processes that occur in each of the electron amplification channels thereof.

57. A high spacial resolution, high-current gain, power microchannel plate assembly, comprising:

means for providing a two-dimensional array of high-efficiency, secondary electron emitting discrete dynode chains that each define an electron amplification channel and that together define a cross-talk-free and high-spacial-resolution high-current two-dimensional charge amplifier; and means coupled to the two-dimensional array of high-efficiency, secondary electron emitting discrete dynode chains for applying a potential across the constituative dynodes of each of the chains of dynodes to control the electron amplification of the channels and for feeding charge into the constituative dynodes of each chain of dynodes to provide high-current and non-saturation-limited electron amplification channels;

said array providing means including a lamination of plural, apertured insulative sheets each having opposing two-dimensional surfaces and a coating of a high-efficiency secondary electron emitting conductive material disposed on the same one of the opposed surfaces of each of the apertured insulative sheets which material partially extends into the apertures of each of the insulative apertured sheets;

the several layers of the high-efficiency secondary electron emitting conductive material disposed on the same one of the opposing surfaces of each of the apertured insulative sheets being electrically isolated from adjacent layers by the intervening insulative sheets.

58. The power microchannel plate assembly of claim 57, wherein said material is composite and includes an electrically conductive underlayer and a high-efficiency secondary electron emitting overlayer.

59. The power microchannel plate assembly of claim 57, wherein said material is a single electrically conductive and high-efficiency secondary electron emitting material 60. The power microchannel plate assembly of claim 57, wherein said potential gradient applying means includes a voltage divider network connected to each of the several coatings of the high-efficiency secondary electron emitting conductive material of the plural sheets.

61. The power microchannel plate assembly of claim 57, wherein each of said plural apertured insulative sheets includes a high-resolution glass capillary array.

62. A high-spacial-resolution charge transfer feedthrough plate subassembly for a charge transfer signal processor, comprising:

plural, longitudinally extending electrically conductive members;

means coupled to said members for supporting said members in a high-spacial resolution two-dimensional array in such a way that each of the conductors is electrically isolated from all of the other conductors in the two-dimensional array; and means cooperative with said supporting means for providing vacuum-tight sealing between all of the electrically conductive and mutually electrically isolated conductors of the two-dimensional array; said electrically conductive members including plural longitudinally extending filaments traversely arrayed in a closely-packed and vacuum-tight two-dimensional array that each include an electrically insulative sheath surrounding a co-axially disposed electrically conductive core.

* * * * *